(12) United States Patent
Kilian

(10) Patent No.: US 7,831,600 B2
(45) Date of Patent: Nov. 9, 2010

(54) CLUSTER COMMUNICATION MANAGER

(75) Inventor: Frank Kilian, Mannheim (DE)

(73) Assignee: SAP AG, Walldorf (DE)

( * ) Notice: Subject to any disclaimer, the term of this patent is extended or adjusted under 35 U.S.C. 154(b) by 444 days.

(21) Appl. No.: 11/322,057

(22) Filed: Dec. 28, 2005

(65) Prior Publication Data

US 2007/0162912 A1    Jul. 12, 2007

(51) Int. Cl.
*G06F 7/00* (2006.01)
*G06F 17/30* (2006.01)
*G06F 17/00* (2006.01)

(52) U.S. Cl. ..................... 707/737; 707/608

(58) Field of Classification Search ............. 707/104.1, 707/608, 737

See application file for complete search history.

(56) References Cited

U.S. PATENT DOCUMENTS

| | | | |
|---|---|---|---|
| 5,592,611 A | 1/1997 | Midgely et al. | |
| 5,832,219 A | 11/1998 | Pettus | |
| 6,625,152 B1 | 9/2003 | Monsen et al. | |
| 6,658,478 B1 * | 12/2003 | Singhal et al. | 709/232 |
| 6,691,165 B1 | 2/2004 | Bruck et al. | |
| 6,801,949 B1 * | 10/2004 | Bruck et al. | 709/232 |
| 6,977,908 B2 | 12/2005 | Azevedo et al. | |
| 7,058,957 B1 * | 6/2006 | Nguyen | 719/318 |
| 7,089,281 B1 | 8/2006 | Kazemi et al. | |
| 7,197,533 B2 * | 3/2007 | Vincent et al. | 709/203 |
| 7,296,267 B2 | 11/2007 | Cota-Robles et al. | |
| 7,302,423 B2 | 11/2007 | De Bellis | |
| 2002/0016867 A1 * | 2/2002 | Kampe et al. | 709/318 |
| 2002/0078060 A1 | 6/2002 | Garst et al. | |
| 2002/0124089 A1 | 9/2002 | Aiken, Jr. et al. | |
| 2003/0014521 A1 | 1/2003 | Elson et al. | |
| 2003/0084100 A1 | 5/2003 | Gahan et al. | |
| 2003/0084248 A1 | 5/2003 | Gaither et al. | |
| 2003/0163523 A1 | 8/2003 | Chang et al. | |
| 2003/0177382 A1 | 9/2003 | Ofek et al. | |
| 2003/0212654 A1 | 11/2003 | Harper et al. | |
| 2004/0010544 A1 | 1/2004 | Slater et al. | |
| 2004/0024971 A1 | 2/2004 | Bogin et al. | |
| 2004/0181537 A1 | 9/2004 | Chawla et al. | |

(Continued)

FOREIGN PATENT DOCUMENTS

WO    WO-00/23898    4/2000

(Continued)

OTHER PUBLICATIONS

"RFC: 793 Transmission Control Protocol DARPA Internet Program Protocol Specification", *IETF*, obtained from http://tools.ietf.org/html/rfc793, (Sep. 1981), p. 8.

(Continued)

*Primary Examiner*—Apu M Mofiz
*Assistant Examiner*—Chelcie Daye
(74) *Attorney, Agent, or Firm*—Blakely Sokoloff Taylor & Zafman

(57) ABSTRACT

A cluster manager application program library includes an event handler to communicate an event from an application server instance to which the library is linked to a message server in a cluster of application server instances. The library further includes a notification handler to receive at the application server instance a notification of an event in the cluster from the message server, and a message server communication handler to exchange messages between the application server instance and other application server instances in the cluster via the message server.

20 Claims, 2 Drawing Sheets

U.S. PATENT DOCUMENTS

2005/0268238 A1* 12/2005 Quang et al. .............. 715/734
2005/0278346 A1  12/2005 Shang et al.
2006/0053112 A1   3/2006 Chitkara et al.
2006/0206856 A1   9/2006 Breeden et al.

OTHER PUBLICATIONS

"What is WebLogic Server?", *BEA*, obtained from http://web.orchive.org/web/20011220220639/http://edocs.bea.com/wis/docs61/intro/chap1.html, (Dec. 21, 2001), p. 1.

Final Office Action for U.S. Appl. No. 11/012,803, Mailed Jul. 22, 2008, 22 pages.

Final Office Action for U.S. Appl. No. 11/013,277, Mailed Aug. 7, 2008, 22 pages.

Non-Final Office Action for US. Appl. No. 11/013,277, Mailed Jan. 6, 2009, 22 pages.

Notice of Allowance for U.S. Appl. No. 11/012,803, Mailed Jun. 10, 2009, 27 pages.

Notice of Allowance for U.S. Appl. No. 11/013,278, Mailed Jun. 11, 2009, 25 pages.

Notice of Allowance for U.S. Appl. No. 11/013,277 dated Jun. 25, 2009; 24 pages.

Notice of Allowability for U.S. Appl. No. 11/012,803, Mailed Sep. 3, 2009, 12 Pages.

* cited by examiner

CLUSTER COMMUNICATION MANAGER

FIELD OF INVENTION

The field of invention relates generally to application servers. In particular, the invention relates to a software library that provides for management of an application server instance and communication between the application server instance and other application server instances in a cluster via a message server or broker.

BACKGROUND

Web application services (Web AS) are commercially available from a number of vendors, such as: NetWeaver Application Server, available from SAP AG, Walldorf, Germany; Apache HTTP Server, version 2.2.0, available from Apache HTTP Server Project, Apache Software Foundation; and Internet Information Services (IIS) 6.0, available from Microsoft Corporation, Redmond, Wash.

Web AS generally are platform-independent, and highly scalable using sophisticated caching, dispatching, and messaging techniques in a distributed computing environment. Web AS may employ a number, or cluster, of application server (AS) instances, each of which may support a number of work processes for receiving and responding to service requests from clients. The cluster of AS instances may be distributed over one or more computing platforms, and typically communicate with each other via a messaging service.

BRIEF DESCRIPTION OF THE DRAWINGS

A better understanding of the present invention can be obtained from the following detailed description in conjunction with the following drawings, in which.

DETAILED DESCRIPTION

Figure 1:
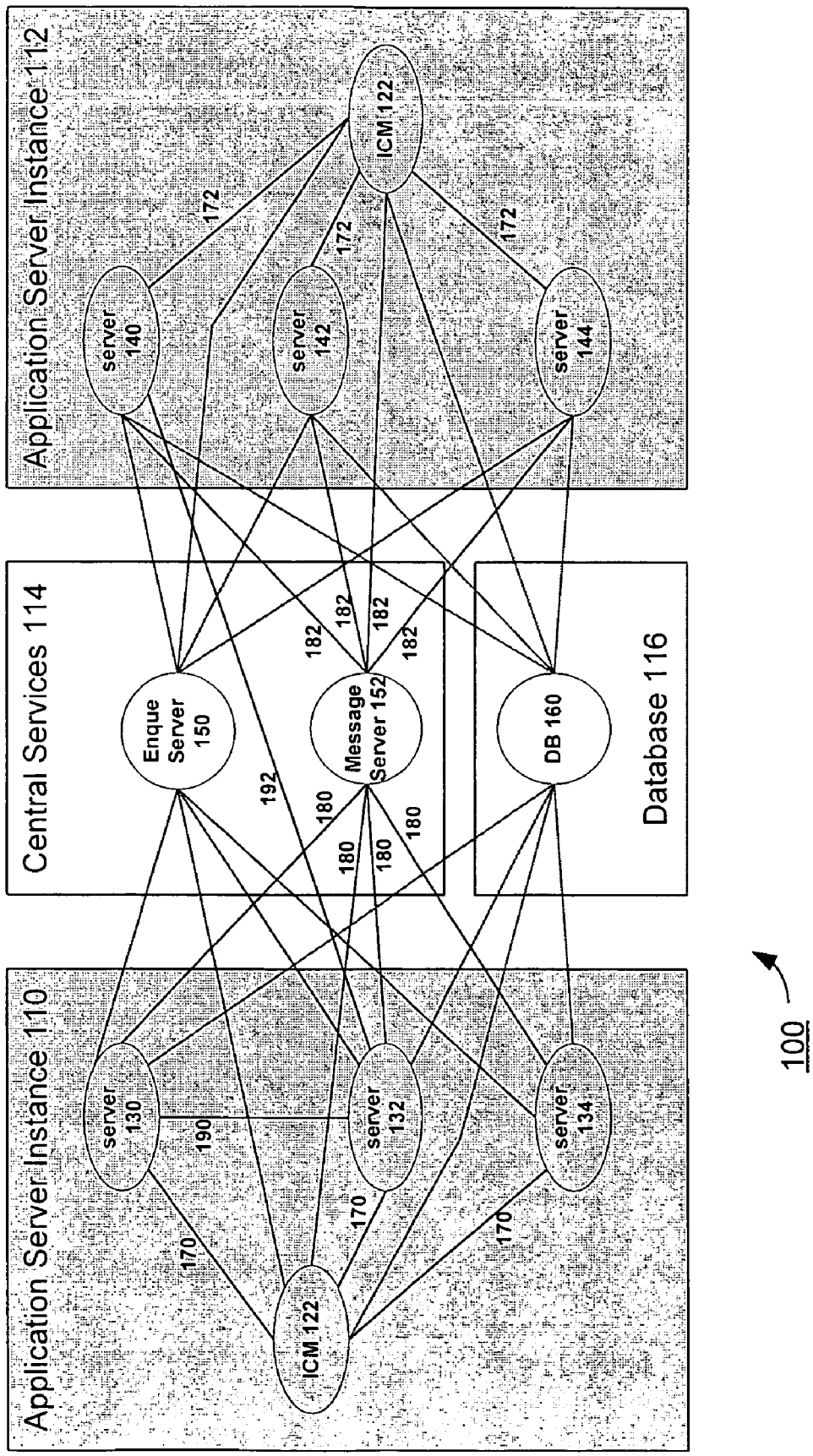
FIG. 1 is a block diagram of an application server cluster architecture in which an embodiment of the invention may be used.

FIG. 1 is a block diagram of an application server cluster architecture 100 in which an embodiment of the invention may be used. The architecture includes a central services instance 114 and a plurality of application server (AS) instances 110, 112 that may implement a Web AS. Each AS instance is a unit in the cluster that can be started, stopped and monitored separately by central services 114. In one embodiment, each AS instance runs on a separate computing platform, for example, a physical server, but more than one AS instance may run on a single platform.

An AS instance typically contains at least one work process, termed herein an "application server node" or simply "server node". (A server node may also be referred to in the art as a worker node, worker process, or server process.) Additionally, an AS instance includes an internetwork communication manager (ICM) to receive service requests from clients via a network and deliver responses (e.g., the result of some action or processing on the part of the server nodes) as may be appropriate, from the server nodes to the clients. An AS instance further includes one or more dispatchers associated with the server nodes to which the dispatcher selectively distributes the client service requests received by the ICM. The dispatcher may be combined with the ICM or, alternatively, the dispatcher may stand alone as a separate program in the AS instance and communicate with the ICM to receive and dispatch the service requests to its associated server nodes.

The example cluster architecture illustrated in FIG. 1 includes one or more AS instances 110, 112 which share a central database system 116 that includes a persistent data store (e.g., database 160) and a central services instance 114. In an embodiment, the cluster may be centrally defined and configured in the central database. The AS instances may communicate with each other via a messaging service 152 of the central services. (The term "service" generally refers to a software entity that provides a function, e.g., as in the case herein, a messaging service).

The AS instances 110 and 112 each include a group of server nodes 130, 132, 134, and 140, 142 and 144, respectively, and an internetwork communication manager (ICM) 120, 122, respectively. Each server node is resident in a virtual machine. In one embodiment, the VM may be a Java Virtual Machine (JVM).

Server nodes 130, 132 and 134 within AS instance 110 provide the business and/or presentation logic for application programs supported by the system. Each server node provides a set of core services to the business and/or presentation logic. Likewise, server nodes 140, 142 and 144 provide support for application programs executing on AS instance 112. Each of the server nodes within a particular AS instance may be configured with a redundant set of application logic and associated data. Each ICM in this example includes at least one dispatcher (not shown) associated with the server nodes in the AS instance to distribute client service requests. For example, a dispatcher embodied in ICM 120 distributes service requests from clients to one or more of server nodes 130, 132 and 134, based, for example, on the load on each of the server nodes. In one embodiment, a dispatcher implements a round-robin policy of distributing service requests (although various alternate load-balancing techniques may be employed). AS instances receive requests from one or more clients, for example, via a web client, over a distributed internetwork such as the Internet. In one embodiment, requests from the web client may be transmitted using hypertext transfer protocol (HTTP), secure HTTP (HTTPS), the simple mail transfer protocol (SMTP), or the simple object access protocol (SOAP).

In one embodiment of the invention, server nodes 130, 132, 134, 140, 142 and 144 are Java 2 Platform, Enterprise Edition ("J2EE") server nodes that support Enterprise Java Bean ("EJB") components and EJB containers (at the business layer) and Servlets and Java Server Pages ("JSP") (at the presentation layer). A J2EE platform complies with the J2EE Standard. Of course, certain aspects of the embodiment of the invention described herein may be implemented in the context of other software platforms including, by way of example, the .NET platform available from Microsoft, the WebSphere platform available from IBM, and the Advanced Business Application Programming ("ABAP") platform available from SAP AG, the assignee of this invention.

In one embodiment, message server 152 provides a message service for inter-AS instance communication via a message passing protocol. For example, if a server node 130 of AS instance 110 has a message to send to AS instance 112 (i.e., an "internal message" from the perspective of the cluster 100), the message is brokered via the message server 152: the message server receives the message from AS instance 110 and then forwards it to AS instance 112, providing for asynchronous communication between the AS instances.

In one embodiment, all communication with the message server is via a cluster manager service, or simply "cluster manager", a software service that handles communicating messages with, and sending and receiving notifications of events in the cluster to/from, the message server. For example, a cluster manager in each AS exchanges messages with message server 152 to facilitate load balancing between various AS instances in the cluster, or to send and receive notification of events that arise within a cluster, for example, failure or shutdown of an AS instance or server node in an AS instance, or when a service is started or stopped. The cluster manager may be part of the ICM, or a separate service available to the AS instance to provide for intra- or inter-AS instance communications via the message server, which brokers such communications. (A broker is defined herein as software entity which mediates between two objects, typically between a client and a server, such as an AS instance (client) and message server (server). In one embodiment, the message server may translate a message from a formal messaging protocol of the sender to the formal messaging protocol of the receiver. The cluster manager may be embodied in an AS instance, for example, either in the ICM, or separate therefrom and either called by the ICM or the server nodes in the AS instance, to provide for communication with the message server.

Figure 2:
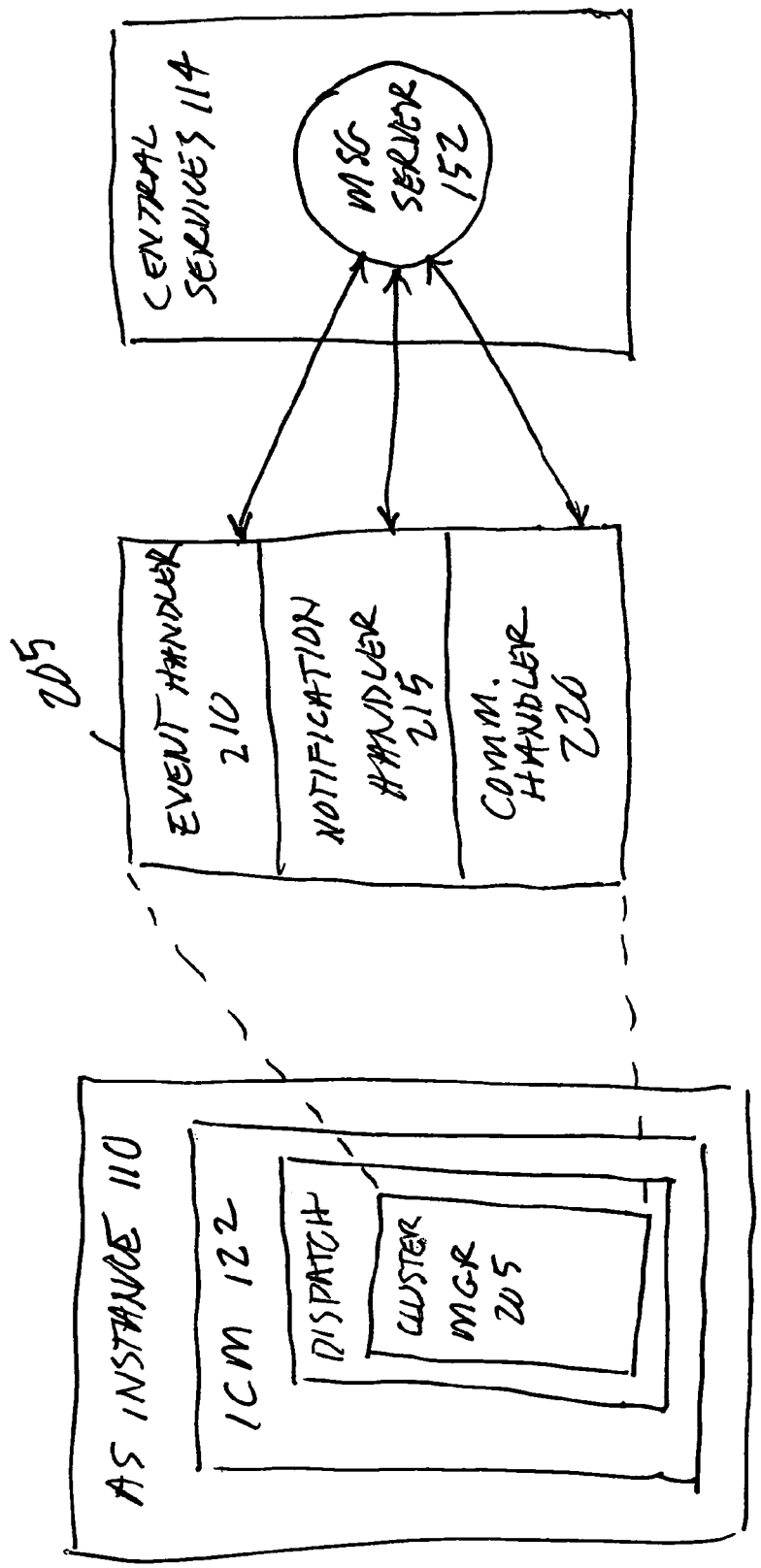
FIG. 2 is a block diagram of an embodiment of the invention.

FIG. 2 illustrates a cluster manager 205 in an application server instance 110. In one embodiment, a dispatcher function includes the cluster manager service 205. However, it should be appreciated that cluster manager 205 may be provided separate from the dispatcher, either as part of ICM 122 or the AS instance 110. Cluster manager may be provided in a library that is either statically linked or dynamically linked to one of the application server instance, ICM 122 or dispatcher.

Cluster manager 205 comprises three handlers: event handler 210, notification handler 215 and message server communication handler 220. A handler is known in the art as a subprogram that is called in response to an "event", such as an AS instance being started or stopped, or adding or stopping a server node. Notification handler 215 is a part of the cluster manager library that is called in response to a specific event in the cluster and performs a function or causes a function to be performed in the AS instance in response to detection and communication of that event from the message server. Likewise, event handler 210 provides notice of an event in the AS instance to the message server. Finally, message server communication handler provides for communicating messages between the AS instance and the message server, which in turn, processes the message and either forwards the message on to appropriate elements in the cluster or generates a new message to do the same.

In one embodiment, the dispatcher is a J2EE dispatcher that distributes client service requests to one of a plurality of J2EE server nodes or work processes. Cluster manager may be written in native application program code such as C, C++, or assembly, and be dynamically linked to one of the dispatcher, ICM or AS instance at run time. In this way, the cluster manager may be written in a language specific to a particular hardware and/or operating system platform, and reusable and portable to other application server instances available from any number of vendors. A cluster manager written in a platform specific language is referred to herein a native cluster manager.

To the extent the dispatcher, ICM or AS instance is implemented in Java code running on a Java virtual machine (VM), a native cluster manager may utilize the Java Native Interface (JNI), which allows Java code running in the Java virtual machine (VM) to call the cluster manager, and allow the cluster manager to call cluster elements implemented in Java code. The JNI is used to write native methods to handle situations if the cluster manager cannot be written completely in the Java programming language, for example, if the standard Java class library does not support any platform-dependent features or program library. JNI may also used to modify the cluster manager, if written in a programming language other than Java, to be accessible to Java applications.

The cluster illustrated in FIG. 1 separates communications relating to external client service requests and responses from internal communications relating to the operation of the cluster. Client service requests and responses, herein referred to as "session" communications, involve an exchange of messages between the ICM/dispatcher and a server node in an AS instance to process the client request or any response thereto. An HTTP request from an external web client such as a web browser application is an example of a session communication. The back and forth communication typically involves a client sending a request that a server node interprets into some action to be performed by the server. The server node performs the action and if appropriate returns a "response" to the client (e.g., a result of the action). Often, a session will involve multiple, perhaps many, requests and responses.

Internal communications, on the other hand, relate to information about events in the cluster, and involve an exchange of messages between server nodes in the cluster. For example, internal communications may be exchanged between server nodes to update state information in the cluster. Cluster state may change upon occurrence of such events as: adding a new server node to the cluster; shutting down an existing server node; changing a state of a server node; or, changing the ability or availability of a server node to communicate with other nodes in the cluster.

Session communications may be separated from internal communications through the use of separate socket connections. Sockets are the mechanisms that allow the elements of the cluster to communicate, either on the same machine or across a network. Each physical server platform in the cluster is identified by some address. In a TCP/IP networking environment, the address may be a network address such as an IP address. Apart from the IP address that specifies a machine, each machine has a number of ports, for example, TCP ports, that allows handling multiple socket connections simultaneously.

In general, a program establishes a socket connection with another program by creating a socket, binding the socket to a specific address, e.g., an IP address, and port, and then listening for requests on the socket to establish a connection. A server node creates a server socket and listens on it to accept socket connections from the ICM/dispatcher node and other server nodes. In one embodiment, a socket connection between a server node and the message server is initiated by the server node to a server socket on the message server created by the message server.

With reference to FIG. 1, in one embodiment, each ICM/dispatcher and server node has a socket connection with message server 152 via respective links 180, 182. Internal communications between individual servers, and between the ICM and/or dispatcher and message server, are transmitted over such socket connections. Contemporaneously, each ICM/dispatcher maintains a separate socket connection with server nodes in the same AS instance via respective links 170, 172. Session communications between ICM/dispatcher and server nodes are transmitted over such socket connections. In one embodiment, the socket connections between the ICM/dispatcher and server nodes are limited to only those server nodes in the same AS instance in which the dispatcher resides, thereby providing for the ability to physically limit communications between dispatchers and server nodes to the same physical server platform.

Thus, each server node has at least two socket connections—one with the dispatcher over which to transmit session communications and one with the message server over which to transmit internal communications. A dispatcher maintains two types of socket connections—a first socket connection between the dispatcher and message server for exchanging internal communications, and multiple instances of a second socket connection, duplicated between the dispatcher and each server node to which it is distributing client requests, for exchanging session communications.

The message server, in one embodiment of the invention, sends a notification or acknowledgement message in response to each message it receives from a server node or a dispatcher. If the message server goes down or otherwise becomes unavailable, a server node that does not receive such an acknowledgement can attempt to retransmit its message to the message server, or wait until it receives an indication that the message server is up and operating again. The message server, upon becoming available, can indicate such in a message, for example, a multicast or broadcast message, sent over the socket connection for internal communications between the message server and each of the server nodes in the cluster.

In one embodiment of the invention, the message server is single threaded, and can become overloaded by messages, creating a bottleneck. To ease message congestion at the message server, a third and different socket connection may be established directly between two server nodes, bypassing the respective socket connections between the server nodes and the message server. For example, server node 130 can establish a socket connection 190 with server node 132 in the same AS instance, for direct intra-AS instance exchange of internal communications. In addition, a server node can establish a socket connection with a server node in a separate AS instance for direct inter-AS instance exchange of internal communications. For example, server node 132 in AS instance 110 can establish a socket connection 192 with server node 140 in AS instance 112, for direct exchange of internal communications, thereby bypassing socket connections between server node 132 and message server 152 and between server node 140 and message server 152.

This third socket connection provides an alternative way for exchanging internal communications between server nodes. A server node can initiate opening of this additional socket connection directly to another server node if, for example, data transfer rates over the internal communications socket connection via the message server meet or exceed a threshold. Likewise, a server node can initiate tearing down the direct socket connection to another server node if, for example, the data transfer rate over one or both of the contemporaneous socket connections to the other server node by way of the message server fall below a certain threshold for some minimum amount of time.

The order of internal messages sent between two server nodes is maintained, even in the event that a separate socket connection is contemporaneously established directly between the two server nodes. This can be accomplished through the use of a single output queue per service on a server node, so whether a message is transmitted from one server node to another via socket connections with the message server, or via the direct socket connection between the server nodes, the message arrives in the same order with respect to other messages in the output queue.

Transmitting multicasting messages among server nodes is accomplished via socket connections for internal communications between each server node and the message server. A server node need only send one multicast message to the message server. The message server replicates the message and transmits it to each destination server node over its respective socket connection with the message server.

Elements of embodiments of the present invention may also be provided as a machine-readable storage medium for storing the machine-executable instructions. The machine-readable storage medium may include, but is not limited to, flash memory, optical disks, CD-ROMs, DVD ROMs, RAMs, EPROMs, EEPROMs, magnetic or optical cards, or other type of machine-readable media suitable for storing electronic instructions. Other embodiments of the invention may be provided as a machine-readable communications medium over which the machine-executable instructions may be downloaded as a computer program which, for example, may be transferred from a remote computer (e.g., a server) to a requesting computer (e.g., a client) by way of data signals embodied in a carrier wave or other propagation medium via a communication link (e.g., a modem or network connection). The computer program may then be executed by a processor in the computer to which the program is transferred.

It should be appreciated that reference throughout this specification to "one embodiment" or "an embodiment" means that a particular feature, structure or characteristic described in connection with the embodiment is included in at least one embodiment of the present invention. These references are not necessarily all referring to the same embodiment. Furthermore, the particular features, structures or characteristics may be combined as suitable in one or more embodiments of the invention.

What is claimed is:

1. A method of managing internal cluster communications in a cluster of application server instances, comprising:
   executing a plurality of work processes in the application server instances;
   establishing internal connections for internal cluster communication between a message server and each of the plurality of work processes executing in the application server instances, wherein internal cluster communication comprises internal communications relating to at least one of events occurring in the cluster and an exchange of messages between work processes executing in the application server instances, the internal connections separate from connections for external cluster communication;
   providing a message service for the internal cluster communication, the internal cluster communication including inter-application server instance communication via the message server in accordance with a connection-based message passing protocol in which an internal connection established in the message server receives a notification message for each event occurring in the cluster and sends acknowledgement messages to internal connections established in the application server instances responsive to receiving messages being exchanged between work processes executing in the application server instances, the message server being shared by the application server instances through the established internal connections for internal cluster communication between the message server and each of the plurality of work processes executing in the application server instances;
   operating a cluster manager to manage the internal cluster communication in accordance with the connection-based message passing protocol, the internal cluster communication sent over the established internal connections for internal cluster communications between the message server and each of the plurality of work processes executing in the application server instances, the cluster manager:

communicating an event in the cluster to the message server using an event handler, the event handler sending a notification message of the event to the message server;

relaying the notification message of the event in the cluster to one or more of the application server instances using a notification handler, the notification handler causing a function to be performed in one or more of the application server instances responsive to receiving the notification message; and communicating messages to be exchanged between work processes executing in the application server instances to and from the message server using a message server communication handler, the message server communication handler:

acknowledging receipt of messages received from the work processes; and relaying messages received from an originating work process to a destination work process, including replicating a multicast message received from the originating work process for broadcast to all other work processes executing in the application server instances.

2. The method of claim 1, wherein the application server instance is a web application server instance.

3. The method of claim 1, wherein the cluster manager is implemented as an executable application program native to a platform on which the application server instance is to execute.

4. The method of claim 1, wherein the platform is specific to a hardware and operating system platform.

5. The method of claim 1, wherein the cluster manager to manage internal cluster communication includes supporting communication between the work processes executing in one of the application server instances with work processes executing in another one of the application server instances in the cluster.

6. The method of claim 1, wherein the message server is in a central services instance in the cluster.

7. A system for managing internal cluster communications in a cluster of application server instances, the system comprising:

server nodes operating in a cluster of application server instances;

a plurality of work processes executing in processors of the server nodes operating in the cluster of application server instances;

a message server providing internal cluster communication, the internal cluster communication including inter-application server instance communication in accordance with a connection-based message passing protocol for the internal cluster communication between the message server and the server nodes operating in the cluster of application server instances in which the message server receives and relays a notification message for each event occurring in the cluster and sends acknowledgement messages responsive to receiving messages being exchanged between work processes executing in processors of the server nodes operating in the application server instances, wherein each work process executing in a processor of a server node operating in the cluster of application server instances is communicatively coupled to the message server and each other via internal connections for the internal cluster communication, the internal connections having been established between the message server and each of the plurality of work processes executing in processors of the server nodes operating in the application server instances, the internal connections having been established separate from connections for external cluster communication, and wherein the internal cluster communication comprises internal communications relating to at least one of events occurring in the cluster and an exchange of messages between work processes executing in processors of the server nodes operating in the application server instances;

a cluster manager executing in processors of the server nodes operating in the cluster of application server instances, the cluster manager to manage internal cluster communications in accordance with the connection-based message passing protocol, the internal cluster communication sent over the internal connections established for internal cluster communication between the message server and each of the plurality of work processes executing in processors of the server nodes operating in the application server instances wherein, on behalf of each application server instance of the cluster of application server instances, the cluster manager operates:

an event handler to communicate an event in the cluster of application server instances from the application server instance to the message server, the event handler sending a notification message of the event to the message server;

a notification handler to relay the notification message of the event in the cluster from the message server to one or more of the application server instances, the notification handler to cause a function to be performed in one or more of the application server instances responsive to receiving the relayed notification message; and a message server communication handler to communicate messages to be exchanged between the work processes executing in an application server instance and other application server instances in the cluster via the message server, the message server communication handler:

acknowledging receipt of messages received from the work processes; and relaying messages received from an originating work process to a destination work process, including replicating a multicast message received from the originating work process for broadcast to all other work processes executing in the application server instances.

8. The system of claim 7, wherein the cluster manager executing in processors of the server nodes operating in the cluster of application server instances is implemented as a software library.

9. The system of claim 8, wherein the software library is dynamically linked with each of the application server instances.

10. The system of claim 9, further wherein the cluster manager executing in processors of the server nodes operating in the cluster of application server instances operates as part of a communication manager executing in processors of the server nodes in each of the application server instances, wherein the software library is dynamically linked to the communication manager in each of the application server instances.

11. An article of manufacture, comprising:
a machine readable storage medium comprising instructions, that when executed by a processor, cause the processor to:
  execute a plurality of work processes in application server instances in a cluster of application server instances;
  establish internal connections for internal cluster communication between a message server and each of the plurality of work processes executing in the application server instances, wherein internal cluster communication comprises internal communications relating to at least one of events occurring in the cluster and an exchange of messages between work processes executing in the application server instances, the internal connections separate from connections for external cluster communication;
  provide a message service for the internal cluster communication, the internal cluster communication including inter-application server instance communication via the message server in accordance with a connection-based message passing protocol in which an internal connection established in the message server receives a notification message for each event occurring in the cluster and sends acknowledgement messages to internal connections established in the application server instances responsive to receiving messages being exchanged between work processes executing in the application server instances, the message server being shared by the application server instances through the established internal connections for internal cluster communication between the message server and each of the plurality of work processes executing in the application server instances;
  manage internal cluster communication in accordance with the connection-based message passing protocol, the internal cluster communication sent over the established internal connections for internal cluster communication between the message server and each of the plurality of work processes executing in the application server instances, including causing the processor to:
    communicate an event from an application server instance in the cluster of application server instances to the message server, including sending a notification message of the event to the message server;
    relay the notification message of the event in the cluster from the message server to one or more of the application server instances and cause a function to be performed in the one or more of the application server instances responsive to receiving the relayed notification message; and
    communicate messages being exchanged between the work processes executing in the application server instances in the cluster via the message server, including:
      acknowledge receipt of messages received from the work processes; and
      relay messages received from an originating work process to a destination work process, including replicating a multicast message received from the originating work process for broadcast to all other work processes executing in the application server instances.

12. The article of manufacture of claim 11, wherein the instructions comprise a library of executable application program code.

13. The article of manufacture of claim 12, wherein the instructions further comprise an instruction to dynamically link the library to an application program to cause the processor to provide a service in the application server instance.

14. The article of manufacture of claim 13, wherein the application program comprises a network communication manager.

15. The method of claim 1, wherein the event in the cluster includes one of an application server instance being started or stopped and a work process executing in the application server instance being started or stopped.

16. The method of claim 1, wherein messages to be exchanged between work processes executing in the application server instances include messages to update state information in the cluster, the state information in the cluster comprising:
  adding a work process;
  removing the work process;
  changing a state of the work process; and
  changing an availability of a work process to communicate with other work processes in the cluster.

17. The system of claim 7, wherein the event in the cluster includes one of an application server instance being started or stopped and a work process executing in the application server instance being started or stopped.

18. The system of claim 7, wherein messages to be exchanged between work processes executing in the application server instances include messages to update state information in the cluster, the state information in the cluster comprising:
  adding a work process;
  removing the work process;
  changing a state of the work process; and
  changing an availability of a work process to communicate with other work processes in the cluster.

19. The article of manufacture of claim 11, wherein the event in the cluster includes one of an application server instance being started or stopped and a work process executing in the application server instance being started or stopped.

20. The article of manufacture of claim 11, wherein messages to be exchanged between work processes executing in the application server instances include messages to update state information in the cluster, the state information in the cluster comprising:
  adding a work process;
  removing the work process;
  changing a state of the work process; and
  changing an availability of a work process to communicate with other work processes in the cluster.

* * * * *